(12) United States Patent
Farahani

(10) Patent No.: US 10,385,967 B2
(45) Date of Patent: Aug. 20, 2019

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventor: Artin Farahani, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 767 days.

(21) Appl. No.: 14/935,583

(22) Filed: Nov. 9, 2015

(65) Prior Publication Data
US 2017/0130837 A1    May 11, 2017

(51) Int. Cl.
*F16H 61/662*    (2006.01)
*F16H 9/18*    (2006.01)

(52) U.S. Cl.
CPC ............. *F16H 61/662* (2013.01); *F16H 9/18* (2013.01); *F16H 61/66259* (2013.01); *F16H 2061/66213* (2013.01)

(58) Field of Classification Search
CPC ............. F16H 9/18; F16H 2061/66213; F16H 2061/66227; F16H 2061/6625; F16H 61/662
See application file for complete search history.

(56) References Cited

U.S. PATENT DOCUMENTS

| | | | |
|---|---|---|---|
| 5,425,689 A | 6/1995 | Genise | |
| 6,183,390 B1* | 2/2001 | Koga | F16H 61/6648 477/37 |
| 7,862,470 B2* | 1/2011 | Eguchi | F16H 61/12 477/40 |
| 2011/0015835 A1 | 1/2011 | Takahashi et al. | |

FOREIGN PATENT DOCUMENTS

| | | |
|---|---|---|
| CN | 1088520 A | 6/1994 |
| CN | 102320295 A | 1/2012 |
| CN | 102378871 A | 3/2012 |
| CN | 102844591 A | 12/2012 |
| CN | 103392085 A | 11/2013 |
| CN | 104514878 A | 4/2015 |
| CN | 104641155 A | 5/2015 |
| CN | 104864089 A | 8/2015 |
| EP | 0879731 A2 | 11/1998 |
| JP | 2005343422 A | 12/2005 |
| JP | 2013151000 A1 | 12/2015 |

* cited by examiner

*Primary Examiner* — Erin D Bishop
(74) *Attorney, Agent, or Firm* — Quinn IP Law

(57) ABSTRACT

Controlling a powertrain system including a continuously variable transmission (CVT) includes determining, employing a first controller, a first desired speed ratio in response to an output torque request. The first desired speed ratio is evaluated to determine if it is valid and achievable. A second controller is employed to determine a second desired speed ratio, and a final desired speed ratio is determined based upon the first and second desired speed ratios. The final desired speed ratio is evaluated, and the CVT is controlled based upon the final desired speed ratio.

10 Claims, 2 Drawing Sheets

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of operating at input/output speed ratios that are infinitely variable over a range between a minimum (underdrive) ratio and a maximum (overdrive) ratio, thus permitting selection of engine operation that achieves a preferred balance of fuel consumption and engine performance in response to an output torque request, which may originate from a vehicle driver. The capability of providing infinitely variable input/output speed ratios distinguishes a CVT from a step-gear transmission that employs a plurality of fixed gear and associated gear ratios that may be selectively engaged in response to an output torque request.

Known chain-type CVTs include two pulleys, each having two sheaves. A chain runs between the two pulleys, with the two sheaves of each of the pulleys sandwiching the chain therebetween. Frictional engagement between the sheaves of each pulley and the chain couples the chain to each of the pulleys to transfer torque from one pulley to the other. One of the pulleys may operate as a drive or input pulley, and the other pulley may operate as a driven or output pulley. The gear ratio is the ratio of the torque of the driven pulley to the torque of the drive pulley. The gear ratio may be changed by urging the two sheaves of one of the pulleys closer together and urging the two sheaves of the other pulley farther apart from each other, causing the chain to ride higher or lower on the respective pulley.

SUMMARY

A powertrain system including a continuously variable transmission (CVT) is described. A method for controlling the CVT includes determining, employing a first controller, a first desired speed ratio in response to an output torque request. The first desired speed ratio is evaluated to determine if it is valid and achievable. A second controller is employed to determine a second desired speed ratio, and a final desired speed ratio is determined based upon the first and second desired speed ratios. The final desired speed ratio is evaluated, and the CVT is controlled based upon the final desired speed ratio.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
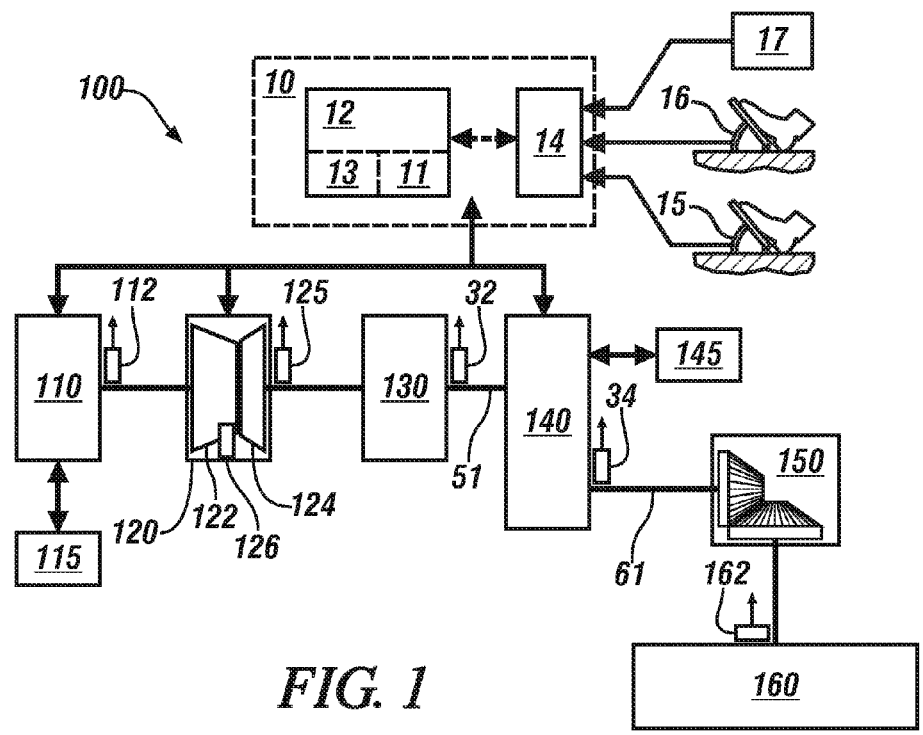
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes an internal combustion engine (engine) 110 rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing fluidic coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162, through which vehicle speed (Vss) is monitored. Each of the aforementioned speed sensors may be any suitable rotation position/speed sensing device, such as a Hall-effect sensor. Each of the aforementioned speed sensors communicates with the control system 10.

The control system 10 preferably includes a controller 12 and a user interface 14. The controller 12 may communicate with a plurality of controller devices, wherein each is associated with monitoring and controlling a single system. This may include an engine control module (ECM) 115 for controlling the engine 110, and a transmission controller (TCM) 145 for controlling the CVT 140 and monitoring and controlling a single subsystem, e.g., a torque converter clutch. The controller 12 preferably includes a non-volatile memory device 11 containing executable instruction sets and a memory cache 13. The user interface 14 communicates with operator input devices including, e.g., an accelerator pedal 15, a brake pedal 16 and a transmission gear selector 17 to determine an output torque request. In one embodiment, the transmission gear selector 17 includes a tap-up/tap-down feature, whereby a vehicle operator may manually select a transmission gear ratio and override automatic control of a speed ratio of the CVT 140. A tap-up command results in a command to the CVT 140 to decrease its gear ratio, which is accomplished by increasing a variator speed ratio. A tap-down command results in a command to the CVT 140 to increase its gear ratio by decreasing the variator speed ratio.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.), including the memory cache 13. The memory cache 13 is preferably configured as a non-volatile memory device having programmable read/write capabilities, which facilitates storage of data arrays for retrieval over off/on power cycles, as may occur in conjunction with vehicle key-off/key-on events. The non-transitory memory component(s) is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

Figure 2:
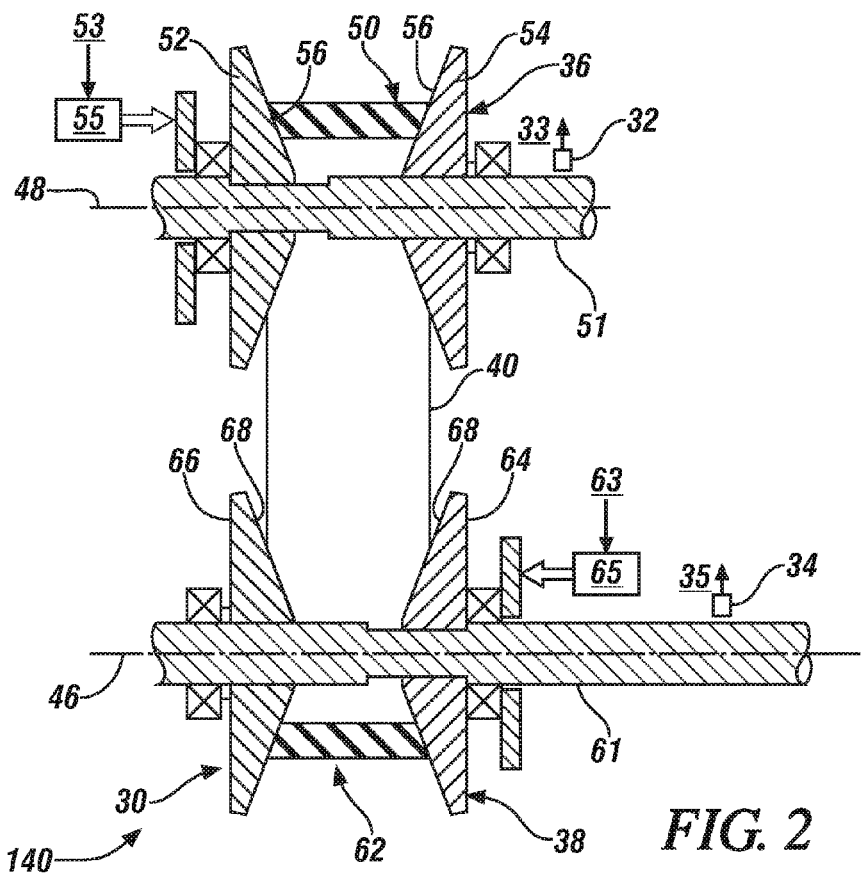
FIG. 2 is a schematic cross-sectional illustration of elements of a variator of a chain-type CVT, in accordance with the disclosure.

FIG. 2 schematically illustrates elements of a variator 30 of a chain-type continuously variable transmission (CVT) 140 that may be advantageously controlled by the TCM 145. The variator 30 transfers torque between the first rotating member 51 and the second rotating member 61. The first rotating member 51 is nominally referred to herein as input member 51, and the second rotating member 61 is nominally referred to herein as output member 61.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device. The input speed sensor 32 may be mounted near the input member 51 to generate a CVT input speed 33 that relates to a speed of the first, input pulley 36, and the output speed sensor 34 may be mounted near the output member 61 to generate a CVT output speed 35 that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque therebetween. As used herein, the term 'speed ratio' refers to a variator speed ratio, which is a ratio of a CVT output speed and a CVT input speed. The CVT input speed may be determined based upon a signal input from one of the engine speed sensor 112, the torque converter turbine speed sensor 125, or the input speed sensor 32, as described herein, or another suitable speed/position sensor. The CVT output speed may be determined based upon a signal input from the output speed sensor 34 or the wheel speed sensor 162 as described herein, or another suitable speed/position sensor. The speed ratio parameters are determined based upon the CVT input speed and the CVT output speed.

The first pulley 36 is split perpendicular to the first axis 48 to define an annular first groove 50 that is formed between a first moveable sheave 52 and a first stationary sheave 54. The first moveable sheave 52 axially moves or translates along the first axis 48 relative to the first stationary sheave 54. For example, the first moveable sheave 52 may be attached to the input member 51 via a splined connection, thereby allowing axial movement of the first moveable sheave 52 along the first axis 48. The first stationary sheave 54 is disposed opposite the first moveable sheave 52. The first stationary sheave 54 is axially fixed to the input member 51 along the first axis 48. As such, the first stationary sheave 54 does not move in the axial direction of the first axis 48. The first moveable sheave 52 and the first stationary sheave 54 each include a first groove surface 56. The first groove surfaces 56 of the first moveable sheave 52 and the first stationary sheave 54 are disposed opposite each other to define the annular first groove 50 therebetween. The opposed first grooved surfaces 56 preferably form an inverted frustoconical shape such that a movement of the first moveable sheave 52 towards the first stationary sheave 54 increases an outer pulley diameter of the annular first groove 50. A first actuator 55 is arranged with the first pulley 36 to control an axial position of the first moveable sheave 52 in response to a drive signal 53, including urging the first moveable sheave 52 towards the first stationary sheave 54. In one embodiment, the first actuator 55 is a hydraulically-controlled device and the drive signal 53 is a hydraulic pressure signal.

The second pulley 38 is split perpendicular to the second axis 46 to define an annular second groove 62 therebetween. The annular second groove 62 is disposed perpendicular to the second axis 46. The second pulley 38 includes a second moveable sheave 64 and a second stationary sheave 66. The second moveable sheave 64 axially moves or translates along the second axis 46 relative to the stationary sheave 66. For example, the second moveable sheave 64 may be attached to the output member 61 via a splined connection, thereby allowing axial movement of the second moveable sheave 64 along the second axis 46. The second stationary sheave 66 is disposed opposite the second moveable sheave 64. The second stationary sheave 66 is axially fixed to the output member 61 along the second axis 46. As such, the second stationary sheave 66 does not move in the axial direction of the second axis 46. The second moveable sheave 64 and the second stationary sheave 66 each include a second groove surface 68. The second groove surfaces 68 of the second moveable sheave 64 and the second stationary sheave 66 are disposed opposite each other to define the annular second groove 62 therebetween. The opposed second grooved surfaces 68 preferably form an inverted frustoconical shape such that a movement of the second moveable sheave 64 towards the second stationary sheave 66 increases an outer pulley diameter of the annular second groove 62. A second actuator 65 is arranged with the second pulley 38 to control an axial position of the second moveable sheave 64 in response to a driven signal 63, including urging the second moveable sheave 64 towards the second stationary sheave 66. In one embodiment, the second actuator 65 is a hydraulically-controlled device and the driven signal 63 is a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

The variator speed ratio is a ratio of the speed of the output member 61 in relation to the speed of the input member 51. An actual speed ratio indicates a present, measured value for the speed ratio, and may be determined based upon a ratio of the output speed signal 35 and the input speed signal 33. A desired speed ratio indicates a commanded, future value for the speed ratio, which may be determined based upon monitored and estimated operating conditions related to an output power command, vehicle speed, engine torque, and other factors. The TCM 145 executes control routines to control the CVT 140 to achieve the desired speed ratio by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired speed ratio, wherein the requisite pressures are preferably in the form of a primary pressure command and a secondary pressure command.

Figure 3:
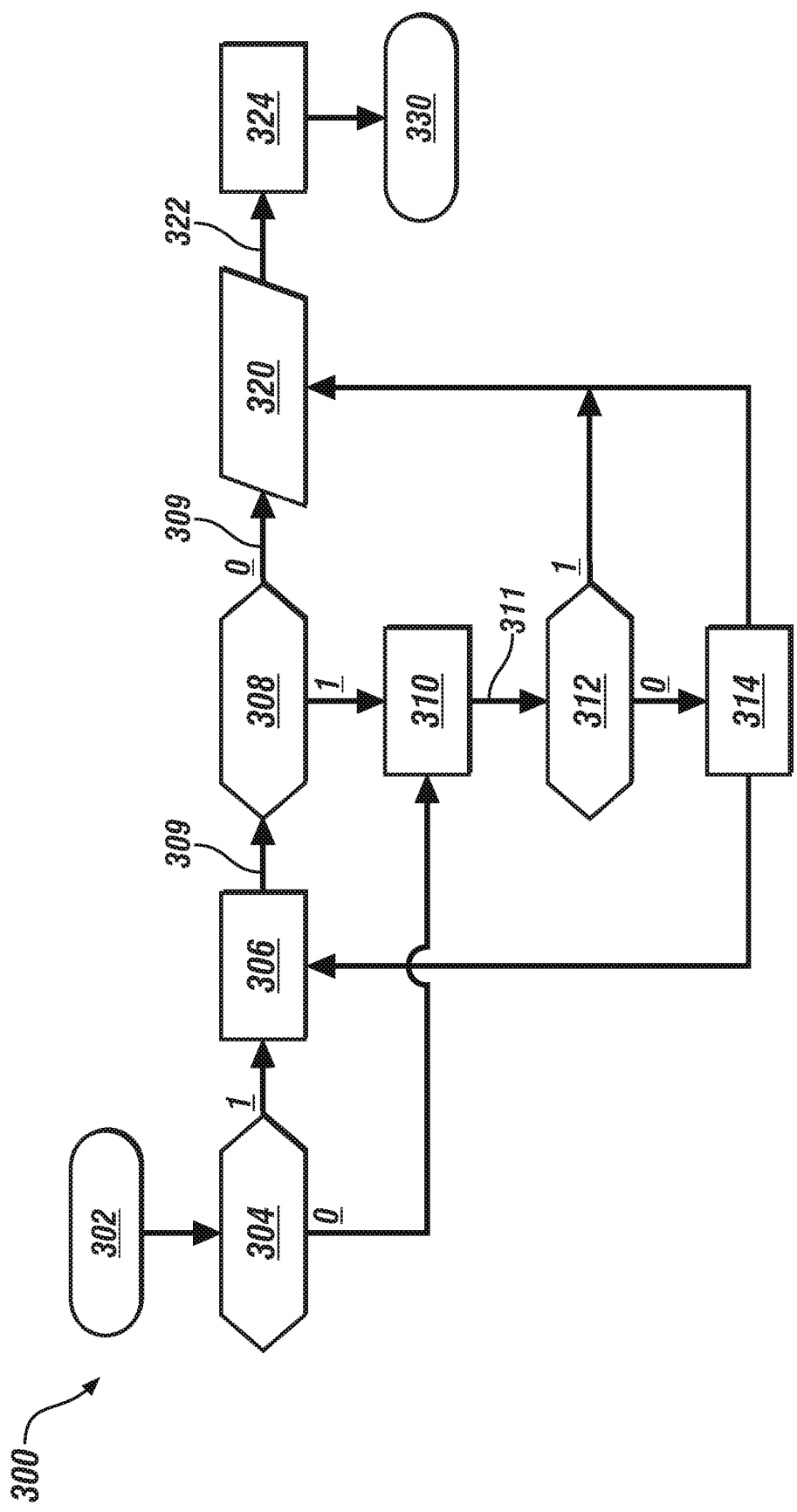
FIG. 3 schematically shows a block diagram of a CVT speed ratio selection routine that may be employed to advantageously determine a desired speed ratio for an embodiment of the CVT and the powertrain system shown with reference to FIGS. 1 and 2, in accordance with the disclosure.

FIG. 3 schematically shows a block diagram of a CVT speed ratio selection routine (routine) 300 that may be employed to advantageously determine a desired speed ratio, including selecting and implementing a preferred desired speed ratio from a first desired speed ratio and a second desired speed ratio. Portions of the routine 300 are preferably executed in by a first control system referred to herein as a supervisory control system (SCS) that may be associated with and executed in the controller 12, and other portions of the routine 300 are preferably executed in the TCM 145. The first desired speed ratio is determined by the supervisory control system, and the second desired speed ratio is determined by a second control system associated with and executed by the TCM 145. The controller 12 communicates with and commands operation of the TCM 145 to control clamping pulley pressure in an embodiment of the powertrain system 100 including the CVT 140 described with reference to FIGS. 1 and 2 to improve responsiveness of the CVT 140 to changes in an output torque request. The routine 300 shown with reference to FIG. 3 is described with reference to Table 1, which is provided as a key wherein the numerically labeled blocks and the corresponding functions are set forth as follows.

TABLE 1

| BLOCK | BLOCK CONTENTS |
|---|---|
| 302 | Initiate iteration, including determining output torque request and states of engine and transmission operating parameters |
| 304 | Is SCS disabled? |
| 306 | Employ SCS to determine first desired speed ratio |
| 308 | Is first desired speed ratio either unachievable or invalid? |
| 310 | Employ TCM to determine second desired speed ratio |
| 312 | Is requested speed ratio achievable? |
| 314 | Determine limited speed ratio |
| 320 | Evaluate first and second desired speed ratios; select final desired speed ratio |
| 324 | Evaluate the final desired speed ratio and adjust |
| 330 | End |

The routine 300 periodically executes to determine and command a desired speed ratio that is valid and achievable, and commands the CVT 140 to implement controls that achieve the desired speed ratio, including controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired speed ratio, wherein the requisite pressures are preferably in the form of a primary pressure command and a secondary pressure command.

Each iteration, the routine 300 determines an output torque request and states of engine and transmission operating parameters (302). The output torque request is preferably determined based upon operator inputs to the accelerator pedal 15, brake pedal 16 and transmission gear selector 17. Alternatively, the output torque request may be based upon a torque request that is generated by an autonomous vehicle control system, such as an adaptive cruise control system or another autonomous system.

The routine 300 determines whether the first, supervisory control system has been enabled or, alternatively, has been disabled (304). The supervisory control system may be disabled, for example when there is a fault in the CVT system or when there is a fault in a system or device supplying information to the supervisory control system. When supervisory control system is disabled (304)(0), a command is sent requesting the TCM 145 to determine a second desired speed ratio 311 in response to the output torque request (310). The second desired speed ratio 311 is determined based upon the capability of the variator 30 to achieve an output speed that is responsive to the output torque request without consideration of factors beyond the variator 30, The second desired speed ratio 311 is evaluated to determine whether it is achievable based upon the present operating conditions and related factors (312). When the second desired speed ratio 311 is unachievable (312)(0), the second desired speed ratio 311 is limited (314) and the limited second desired speed ratio 311 is communicated to a selection step (320) and also provided as feedback to the supervisory control system to generate a first desired speed ratio 309 for controlling the CVT based upon a current speed ratio, a rate of change of the current speed ratio, and an achievable speed ratio range (306).

When the supervisory control system is enabled (304)(1), the supervisory control system generates a first desired speed ratio 309 for controlling the CVT (306), which is evaluated to determine whether it is valid and achievable during the next iteration (308). The supervisory control system generates the first desired speed ratio 309 for controlling the CVT based upon a current speed ratio, a rate of change of the current speed ratio, and an achievable speed ratio range (306). Operation of a supervisory control system and parameters for controlling the CVT including the current speed ratio, the rate of change of the current speed ratio, and the achievable speed ratio range are known to those skilled in the art and not described herein. Such parameters for controlling the CVT include, by way of non-limiting example, hydraulic pressure, engine speed, fluid temperature, wear ratios and the like.

The achievable speed ratio range is provided by the TCM 145 to the supervisory control system. This is done dynamically. In other words, the speed ratio range may change as the vehicle operating conditions change. For example, depending on some sensor or calculated signal, the TCM 145 may decide to narrow or widen the achievable speed ratio range, and communicate this to the supervisory control system.

Evaluating whether the first desired speed ratio 309 is valid and achievable during the next iteration (308) includes determining whether there are faults in the inputs employed in determining the first desired speed ratio using the supervisory control system. Such faults may include, by way of non-limiting examples, faults in any of the rotational speed sensors, controller faults, temperature sensor faults, or other system and component faults that may interfere with determining a valid desired speed ratio.

When the first desired speed ratio 309 from the supervisory control system is invalid or unachievable (308)(1), or the supervisory control system is disabled (304)(0), the TCM 145 determines the second desired speed ratio 311 (310), When the second desired speed ratio 311 is achievable (312)(1), the second desired speed ratio 311 is forwarded to the selection step (320). Thus, if the TCM 145 does not receive a valid ratio from the supervisory control system, the TCM 145 defaults to its own ratio selection strategy.

Evaluating whether the first desired speed ratio 309 is achievable during the next iteration (308) includes determining whether the CVT is capable of achieving the first desired speed ratio based upon states of various system operating parameters including hydraulic pressure, engine speed, fluid temperature, wear ratios and the like. When the first desired speed ratio 309 is either invalid or unachievable (308)(1), the TCM 145 is employed to determine the second desired speed ratio 311, preferably based upon an axle torque based CVT ratio selection routine or another suitable routine (310). The second desired speed ratio 311 is communicated to the supervisory control system to generate a new value for the first desired speed ratio 309 based thereon (306). The second desired speed ratio 311 is also communicated to the selection step (320).

The selection step (320) includes evaluating the first desired speed ratio 309 and the second desired speed ratio 311, including employing arbitration to select a final desired speed ratio 322 when the first desired speed ratio 309 is valid and achievable (308)(0). Furthermore, the selection step (320) may evaluate only the second desired speed ratio 311 when the first desired speed ratio 309 is invalid or unachievable. This may include employing arbitration to select a final desired speed ratio 322 (330). The TCM 145 transitions from one speed ratio to another speed ratio in a manner that is consistent with its operating strategy. If the current operating strategy allows step changes, then a step change from one speed ratio to another is commanded. Otherwise, a continuous speed ratio change is commanded. The routine 300 evaluates the final desired speed ratio 322 in view of environmental factors, driving conditions, driver inputs and other factors. The routine 300 may adjust the final desired speed ratio 322 by increasing or decreasing its magnitude such that it is achievable based upon this evaluation (324). The evaluation accounts for communication latencies between the TCM 145 and the controller 12.

The adjusted final desired speed ratio 322 is implemented by the TCM 145 to control the CVT 140, and this iteration of the routine 300 ends (330). Controlling the CVT 140 includes, in one embodiment, executing a closed loop pulley pressure control routine to determine a final clamping pressure command. The final clamping pressure command is a pressure command to drive an actuator of a moveable sheave of one of the first and second pulleys 36, 38 of the variator 30 of the CVT 140 based upon a final clamping pressure command. As previously indicated, either of the first and second pulleys 36, 38 may act as a clamping pulley. The pulley pressure is a pulley clamping pressure to control the CVT 140 to a preferred operating point, e.g., a preferred speed ratio, as part of controlling the powertrain system 100 to generate torque in response to an output torque request, e.g., from an operator input to the accelerator pedal 15 and/or the brake pedal 16. The pulley pressure is based upon a signal input indicating actual pressure exerted on the primary pulley or the secondary pulley, and may be based upon a signal from a pressure sensor arranged to monitor the pulley pressure, or may be based upon other signals, e.g., signals 33, 35 from the rotational speed sensors 32, 34.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a continuously variable transmission (CVT) of a powertrain system, the method comprising:
   determining, employing a first controller, a first desired speed ratio in response to an output torque request when the first controller is enabled, and determining whether the first desired speed ratio is valid and achievable;
   determining, employing a second controller, a second desired speed ratio in response to the output torque request when either the first controller is disabled or when the first desired speed ratio is either invalid or unachievable;
   determining a final desired speed ratio based upon one of the first and second desired speed ratios;
   evaluating the final desired speed ratio;
   adjusting the final desired speed ratio based upon the evaluation; and
   controlling the CVT based upon the adjusted final desired speed ratio.

2. The method of claim 1, comprising determining, employing the second controller, the second desired speed ratio when the second controller determines the first desired speed ratio is unachievable, and determining the final desired speed ratio to be the second desired speed ratio.

3. The method of claim 1, comprising determining, employing the second controller, the second desired speed ratio when the second controller determines the first desired speed ratio is invalid, and determining the final desired speed ratio to be the second desired speed ratio.

4. The method of claim 1, wherein controlling the CVT based upon the final desired speed ratio comprises controlling, via the second controller, a pressure command to drive an actuator of a moveable sheave of a clamping pulley of the CVT based upon a commanded clamping pressure associated with the adjusted final desired speed ratio.

5. The method of claim 1, wherein the first controller is a supervisory control system and the second controller is a CVT controller.

6. A method for controlling a continuously variable transmission (CVT) of a powertrain system in response to a driver command, the method comprising:
   determining, employing a supervisory control system, a first desired speed ratio in response to the driver command when the supervisory control system is enabled, and determining whether the first desired speed ratio is valid and achievable;
   determining, employing a transmission controller, a second desired speed ratio in response to the driver command when either the supervisory control system is disabled or when the first desired speed ratio is either invalid or unachievable;
   determining a final desired speed ratio based upon one of the first and second desired speed ratios;
   evaluating the final desired speed ratio;
   adjusting the final desired speed ratio based upon the evaluation; and
   controlling the CVT based upon the adjusted final desired speed ratio.

7. The method of claim 6, further comprising determining, employing the transmission controller, the second desired speed ratio when the transmission controller determines the first desired speed ratio is unachievable, and determining the final desired speed ratio to be the second desired speed ratio.

8. The method of claim 6, further comprising determining, employing the transmission controller, the second desired speed ratio when the second controller determines the first desired speed ratio is invalid, and determining the final desired speed ratio to be the second desired speed ratio.

9. The method of claim 6, wherein controlling the CVT based upon the final desired speed ratio comprises controlling, via the second controller, a pressure command to drive an actuator of a moveable sheave of a clamping pulley of the CVT based upon a commanded clamping pressure associated with the adjusted final desired speed ratio.

10. A powertrain system, comprising:
   a continuously variable transmission, including:
      a variator including a first pulley and a second pulley, the first and second pulleys rotatably coupled by a flexible continuous rotatable device, wherein the first pulley rotatably couples to an input member and the second pulley rotatably couples to an output member,
      the first pulley including a moveable sheave that translates along a first axis relative to a stationary sheave in response to urging of a first actuator, and the second pulley including a moveable sheave that translates along a second axis relative to a stationary sheave in response to urging of a second actuator;
   a transmission controller operatively connected to the first and second actuators and in communication with a first sensor configured to monitor a first speed associated with the first pulley and a second sensor configured to monitor a second speed associated with the second pulley;
   a supervisory control system operatively connected to the powertrain system and in communication with the transmission controller;
   the supervisory control system and the transmission controller operative to:
      determine whether the supervisory control system is enabled;

determine, employing an executable instruction set in the supervisory control system, a first desired speed ratio in response to an output torque request when the supervisory control system is enabled, and determine whether the first desired speed ratio is valid and achievable, determine, employing an executable instruction set in the transmission controller, a second desired speed ratio in response to the output torque request when either the supervisory control system is disabled or when the first desired speed ratio is either invalid or unachievable, determine, employing an executable instruction set in the supervisory control system, a final desired speed ratio based upon one of the first and second desired speed ratios, evaluate, employing an executable instruction set in the transmission controller, the final desired speed ratio, adjust, employing an executable instruction set in the transmission controller, the final desired speed ratio based upon the evaluation, and control, employing an executable instruction set in the transmission controller, the CVT based upon the adjusted final desired speed ratio.

* * * * *